United States Patent
Jensen et al.

(10) Patent No.: US 10,533,670 B2
(45) Date of Patent: Jan. 14, 2020

(54) COMPACT DOUBLE SHUT-OFF VALVE

(71) Applicant: PARKER-HANNIFIN CORPORATION, Cleveland, OH (US)

(72) Inventors: Russell David Jensen, Modesto, CA (US); Gary A. Garcia, Modesto, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 923 days.

(21) Appl. No.: 14/732,178

(22) Filed: Jun. 5, 2015

(65) Prior Publication Data
US 2015/0354712 A1 Dec. 10, 2015

Related U.S. Application Data

(60) Provisional application No. 62/008,120, filed on Jun. 5, 2014, provisional application No. 62/088,989, filed on Dec. 8, 2014.

(51) Int. Cl.
*F16K 11/02* (2006.01)
*B01D 35/15* (2006.01)
(Continued)

(52) U.S. Cl.
CPC .......... *F16K 11/02* (2013.01); *B01D 35/1573* (2013.01); *Y10T 137/86558* (2015.04)

(58) Field of Classification Search
CPC ...... F16K 11/02; F16K 11/085; F16K 11/076; F02M 37/221; B01D 36/003; B01D 35/12;
(Continued)

(56) References Cited

U.S. PATENT DOCUMENTS 4,466,457 A * 8/1984 Brane ................ F16K 11/10
137/599.12
4,469,121 A * 9/1984 Moen ................ F16K 11/0746
137/100
(Continued)

FOREIGN PATENT DOCUMENTS

CN 203 525 425 U 4/2014
EP 0084131 A1 * 7/1983 .......... F16K 11/0746
(Continued)

OTHER PUBLICATIONS

European Search Report for corresponding Patent Application No. 15170842.7 dated Oct. 13, 2015.

*Primary Examiner* — Krishnan S Menon
*Assistant Examiner* — Waqaas Ali
(74) *Attorney, Agent, or Firm* — Renner, Otto, Boisselle & Sklar, LLP

(57) ABSTRACT

A valve member having a first flow path and a second flow path, and configured to control both flow paths through a filter assembly. The valve member allows control of the two flow streams in a compact space compared to traditional valves. The valve member may require less space to operate due to its compact nature as compared to traditional external valves with multiple handles that each require space to rotate. The valve member may also be used to easily shut-off flow to a filter of a filter assembly without limiting use of another filtration assembly in the same filtration system. Alternatively, the valve member may shut off flow to a corresponding filter of a stand-alone filter assembly that is not connected to another filter assembly. Also, the valve member allows less expensive and more lightweight filtration systems.

11 Claims, 13 Drawing Sheets

(51) Int. Cl.
*F02M 37/24* (2019.01)
*B01D 35/157* (2006.01)

(58) Field of Classification Search
CPC .... B01D 35/303; B01D 35/157; B01D 29/52; B01D 35/1573; Y10T 137/86558
See application file for complete search history.

(56) References Cited

U.S. PATENT DOCUMENTS

| | | | |
|---|---|---|---|
| 5,792,373 | A | 8/1998 | Bennick et al. |
| 6,412,513 | B1 * | 7/2002 | Yang ............... F16K 27/041 137/100 |
| 6,797,165 | B2 | 9/2004 | Harrison |
| 2004/0182455 | A1 | 9/2004 | Wells et al. |
| 2013/0087232 | A1 * | 4/2013 | Tung ............... F16K 11/048 137/625.17 |
| 2014/0158590 | A1 | 6/2014 | Shaffer |

FOREIGN PATENT DOCUMENTS

| | | |
|---|---|---|
| FR | 2 263 434 A1 | 10/1975 |
| GB | 1 056 588 A1 | 1/1967 |
| GB | 1 435 367 A1 | 5/1976 |
| WO | 91/16124 A1 | 10/1991 |
| WO | 2006/074137 A2 | 7/2006 |
| WO | 2014/016479 A1 | 1/2014 |

\* cited by examiner

COMPACT DOUBLE SHUT-OFF VALVE

RELATED APPLICATIONS

This application claims the benefit of U.S. Provisional Application No. 62/008,120 filed Jun. 5, 2014, and claims the benefit of U.S. Provisional Application No. 62/088,989 filed Dec. 8, 2014, which are incorporated herein by reference.

FIELD OF INVENTION

The present invention relates generally to valves, and more particularly to shut-off valves that may be utilized in filtration systems having multiple filter assemblies.

BACKGROUND

Diesel or gasoline grade fueled vehicles, such as marine vehicles with marine engines, typically receive fuel from a fuel filtration system. The fuel filtration systems often include a manifold that is fixed to the marine vehicle and used to supply clean fuel to engines. Traditionally, a filtration system separates contaminants, such as solids and water molecules, from the fuel to prevent excess engine damage and/or wear.

Typically, a filtration system includes a plurality of filter units that mount to the marine vehicle and fluidly connect to at least one external valve through a manifold to control fuel flowing to or from the corresponding filter unit. Thus, shutting off flow to a single filter unit may require operation of two valves to allow maintenance of each filter unit in the filtration system or replacement of a filter of a corresponding filter unit. The external valves tend to be bulky and heavy, particularly because each filter unit requires two valves to control flow to and from each filtration unit. Also, increasing the number of filter units in a filtration system typically requires an entirely new external manifold to connect the new filter units, which may require more manufacture and assembly time, as well as additional space around each filter unit.

SUMMARY OF INVENTION

The present invention provides a valve member configured to control two flow streams. The valve member allows control of the two flow streams in a more compact space as compared to traditional valves. The valve member may require less space to operate due to its compact nature as compared to traditional external valves with multiple handles that each requires space to rotate. The valve member may also be used to easily shut off flow to a filter of a filter assembly without limiting use of another filtration assembly in the same filtration system. Alternatively, the valve member may shut off flow to a corresponding filter of a stand-alone filter assembly that is not connected to another filter assembly.

Also, the valve member allows less expensive and more lightweight filtration systems. Traditional filtration assemblies require two valves, one to control flow into a filtration assembly and one to control flow out of the filtration assembly, which increases cost and weight of the corresponding filtration system and increases potential for external leakage.

A manifold module provides easy increase and decrease of the number of filter assemblies in the filtration system. The manifold module does not require a space, cost, and time consuming external manifold. Rather, the manifold module may be easily stacked adjacent another manifold module or unstacked from another manifold module to easily increase or decrease the number of filter assemblies.

According to an aspect of the invention, a filter assembly comprising a manifold module having a portion of a supply line, a portion of a discharge line, and a valve passage fluidly connecting the portion of the supply line to the portion of the discharge line, and a valve member extending along a longitudinal axis and having a first inlet fluidly connected to the portion of the supply line and a first outlet, and having a second inlet fluidly connected to the portion of the discharge line and the second outlet, wherein the valve member is configured to allow a first fluid flow from the first inlet to the first outlet and from the first outlet to the filter, and allow a second fluid flow from the filter to the second inlet and from the second inlet to the second outlet when the valve member is in an open position, and wherein the first fluid flow and the second fluid flow do not inter-mix.

According to another aspect, a drum shaped seal comprising a first circular portion, a second circular portion, and a plurality of axially extending portions separating the first circular portion from the second circular portion.

DETAILED DESCRIPTION

The principles of this present application have particular application to filter assemblies for removing particulates and other contaminants from a fluid system, such as from a fuel stream in a fuel system for a marine vehicle, such as a boat, and thus will be described below chiefly in this context. It will be understood that principles of this invention may be applicable to other filter assemblies where it is desirable to remove particulates and/or water from a fluid, such as from fluid in an aircraft or other vehicle.

Figure 1:
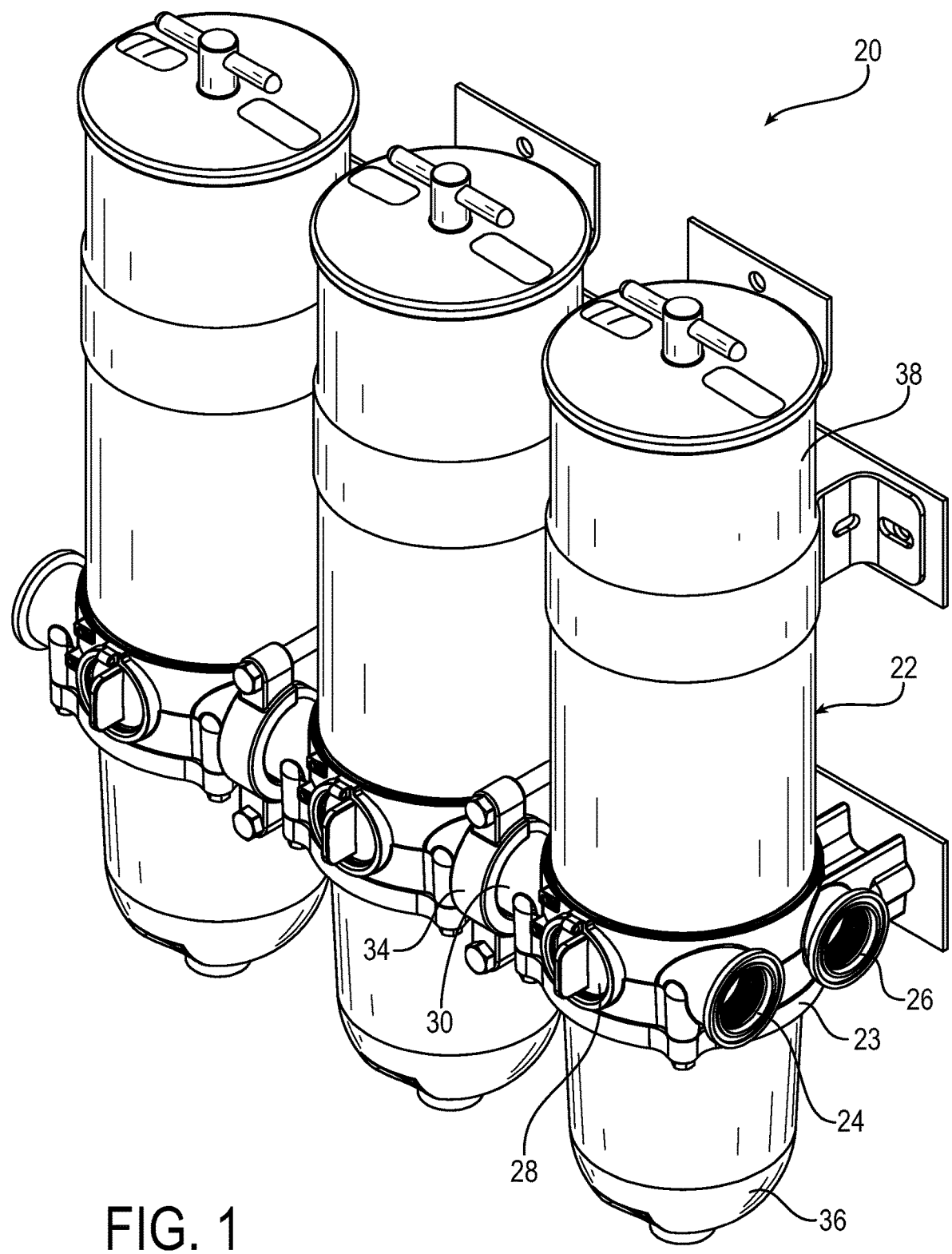
FIG. 1 is a perspective view of an exemplary filtration system including a plurality of filter assemblies.
Figure 2:
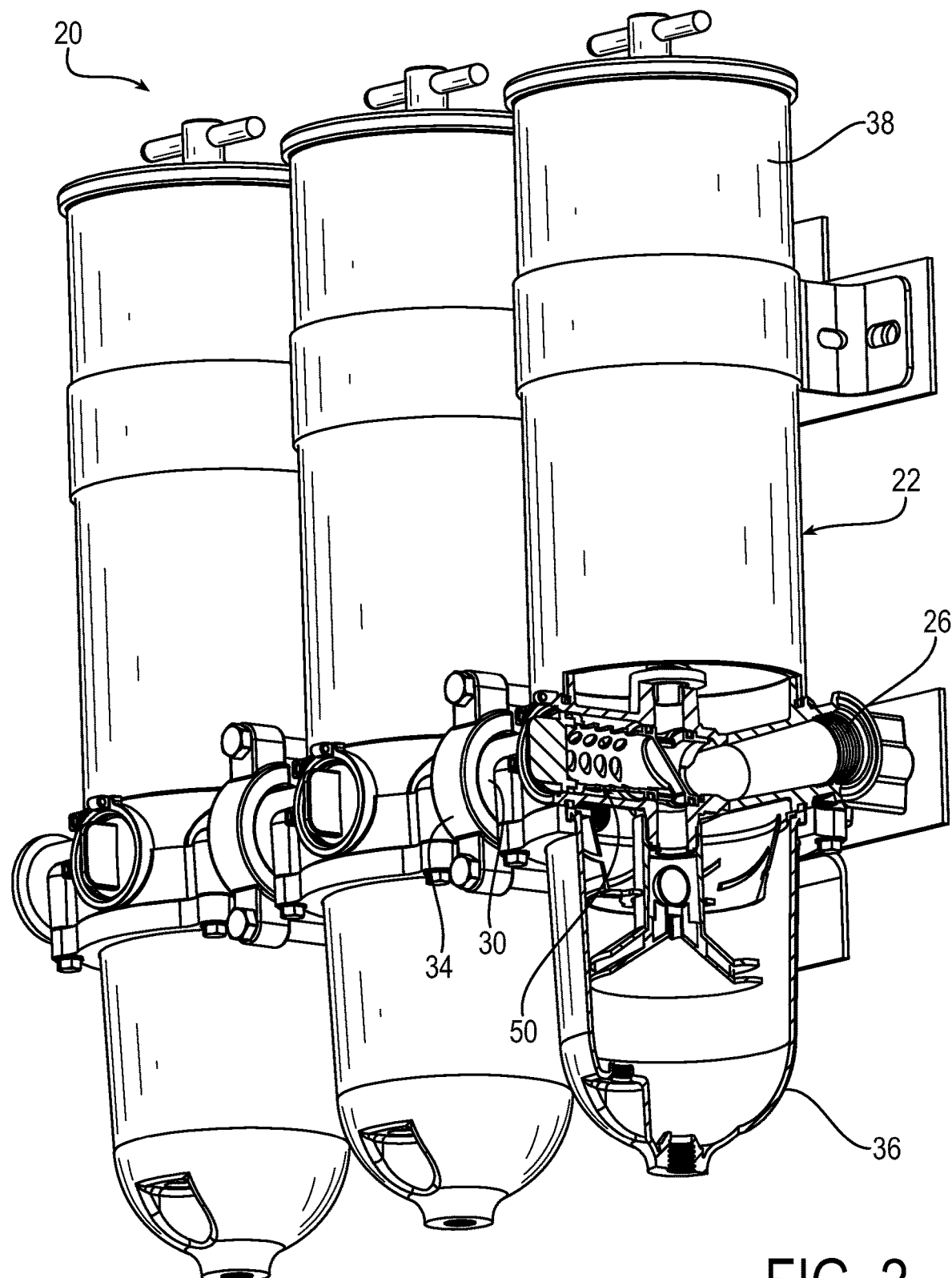
FIG. 2 is a perspective view of the filtration system of FIG. 1 with a portion of one of the filter assemblies cut-out.
Figure 3:
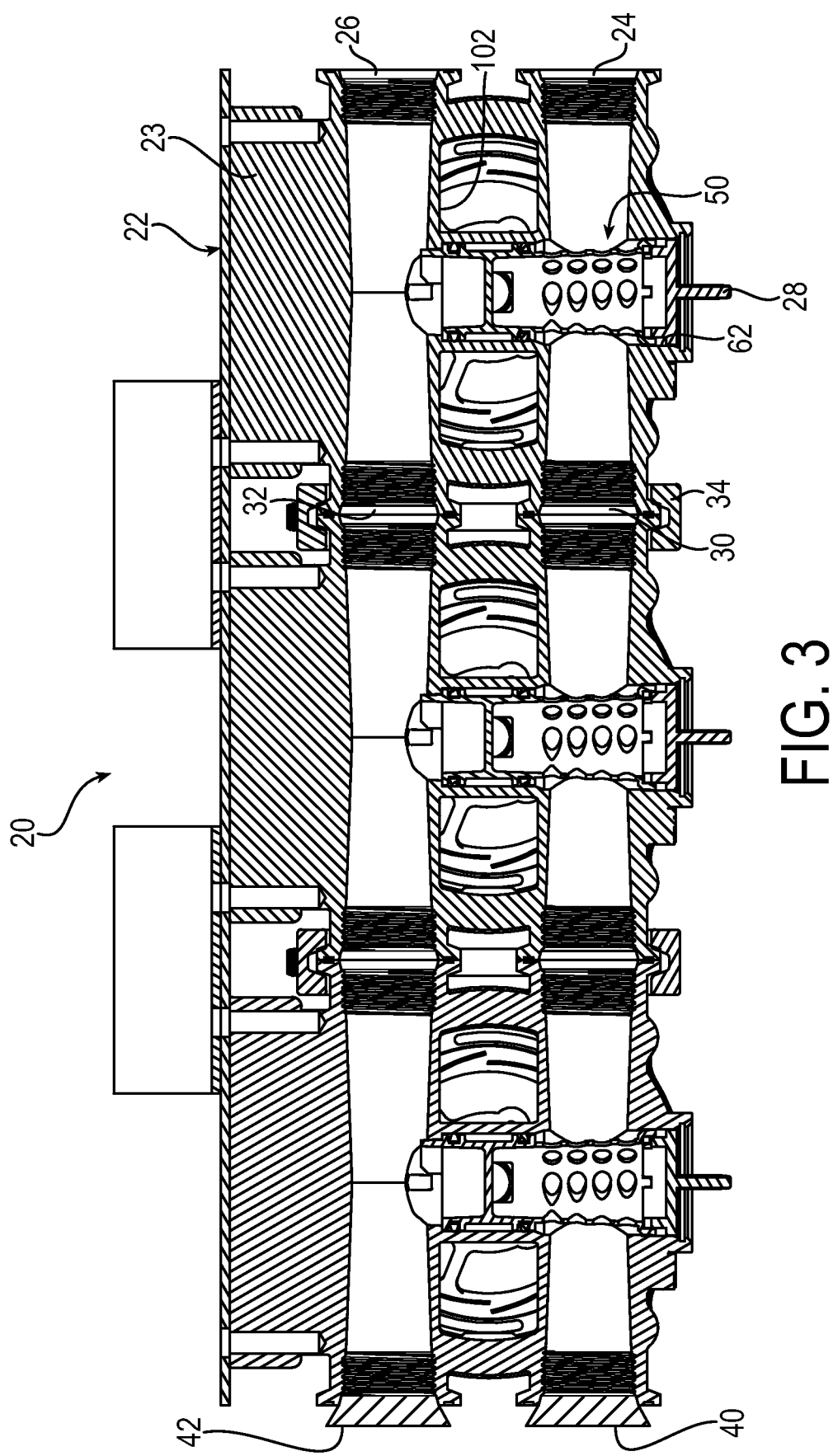
FIG. 3 is a cross-section of the filtration system of FIG. 1.

Referring now in detail to the drawings, and initially to FIGS. 1-3, a filtration system 20 is illustrated. The filtration system 20 includes a plurality of filter assemblies 22 fluidly connected to one another in a stacked relationship. Each filter assembly may include a manifold module 23 having a first inlet 24, a first outlet 26, a valve control 28, a second outlet 30 and a second inlet 32, a clamp 34 for connecting an adjacent filter assembly, a coalescer 36, a filter housing 38 and a valve 50 for controlling fluid flow from the first inlet 24. The first inlet 24 and the second outlet 30 may form a portion of a supply line to supply unfiltered fluid to each filter assembly 22. The second inlet 32 and the first outlet 26 may form a portion of a discharge line to discharge filtered fluid to a component, such as an engine. The valve control 28 may control fluid flow between the first inlet 24 and an interior of the filter housing, as well as fluid flow between the interior of the filter housing and the portion of the discharge line of the filter assembly 22.

The filtration system 20 may be permanently fixed to an interior of a vehicle, such as a boat. For example, the filtration system 20 may include brackets to mount the filtration system 20 to an interior wall of the boat.

The stacked relationship of the filter assemblies 22 allows easily connecting or disconnecting the filter assemblies 22 to one another and allows a compact overall design. Each valve control 28 may facilitate the stacked relationship by controlling two fluid flow paths within each filter assembly 22, one for unfiltered fluid flow and the other for filtered fluid flow.

The filter assemblies 22 may be fluidly connected in series with one another by each manifold module 23 that is assembled with an adjacent manifold module in a stacked relationship. The second outlet 30 of the filter assembly 22 may be fluidly connected to an inlet of an adjacent filter assembly, and the next filter assembly may be connected similarly. The second outlet 30 and the adjacent inlet may form a supply line. For example, each filter assembly 22 is connectable to an adjacent filter assembly with an axially facing seal and/or the clamp 34. The last filter assembly may include a plug or stop 40 (shown in FIG. 3) to prevent unfiltered fluid flow through its corresponding outlet. Utilizing the same first inlet 24 and second outlet 30 for each filter assembly 22 allows modularly expanding or contracting the filtration system 20 to increase or decrease functionality of the filtration system 20. Alternatively, the last filter assembly may not include an outlet for allowing passage of unfiltered fluid. In an embodiment, the outlet for unfiltered fluid, of the last filter assembly, acts as an inlet for providing unfiltered fluid to the filter assemblies.

The second inlet 32 of the filter assembly 22 (shown in FIG. 3) may be fluidly connected to an outlet of an adjacent filter assembly, and the next filter assembly may be connected similarly. The second inlet 32 and the adjacent outlet may form a discharge line. The last filter assembly may include a plug or stop 42 (shown in FIG. 3) to prevent filtered fluid flow through its corresponding inlet. Utilizing the same second inlet 32 and first outlet 26 for each filter assembly 22 allows modularly expanding or contracting the filtration system 20 to increase or decrease functionality of the filtration system 20. Alternatively, the last filter assembly may not include an inlet for allowing passage of filtered fluid. In an embodiment, the inlet for filtered fluid, of the last filter assembly, acts as an outlet for providing filtered fluid to another component, such as an engine.

During use unfiltered fluid may enter through the first inlet 24 and flow through the valve 50 to each adjacent filter assembly through the corresponding inlet. When the valve 50 is in an open position, unfiltered fluid flows through the valve 50 to the coalescer 36 and to the filter housing 38. From the filter housing 38 filtered fluid flows to the valve 50 to provide filtered fluid flow to the first outlet 26. When the valve 50 is in a closed position, unfiltered fluid is prevented from flowing from the valve 50 to the coalescer 36 and filtered fluid is prevented from flowing from the filter housing 38 through the valve 50 to the first outlet 26. Unfiltered fluid may continue to flow through the valve 50 to the adjacent filter assembly to allow a similar direction of flow to a corresponding coalescer and filter housing. In an alternative embodiment, when the valve is in the closed position, or a partially closed position, the valve may prevent unfiltered fluid from flowing to an adjacent filter assembly.

Figure 4:
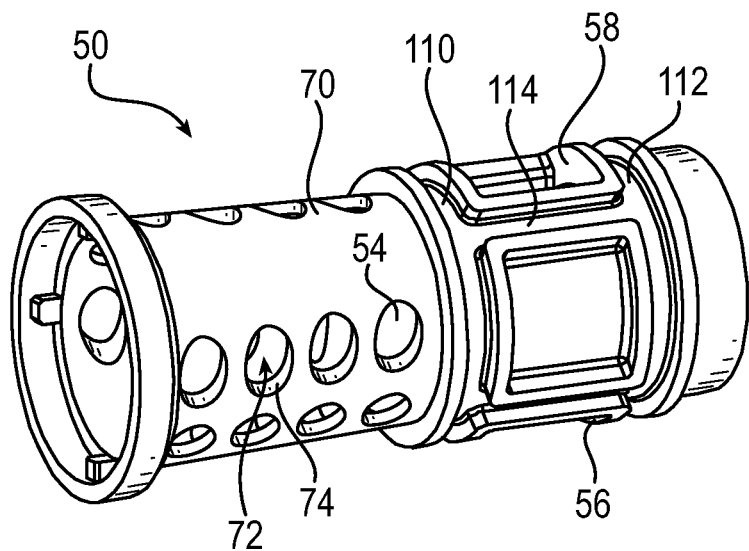
FIG. 4 is a perspective view of an exemplary valve member for use in the filtration system of FIG. 1.
Figure 9:
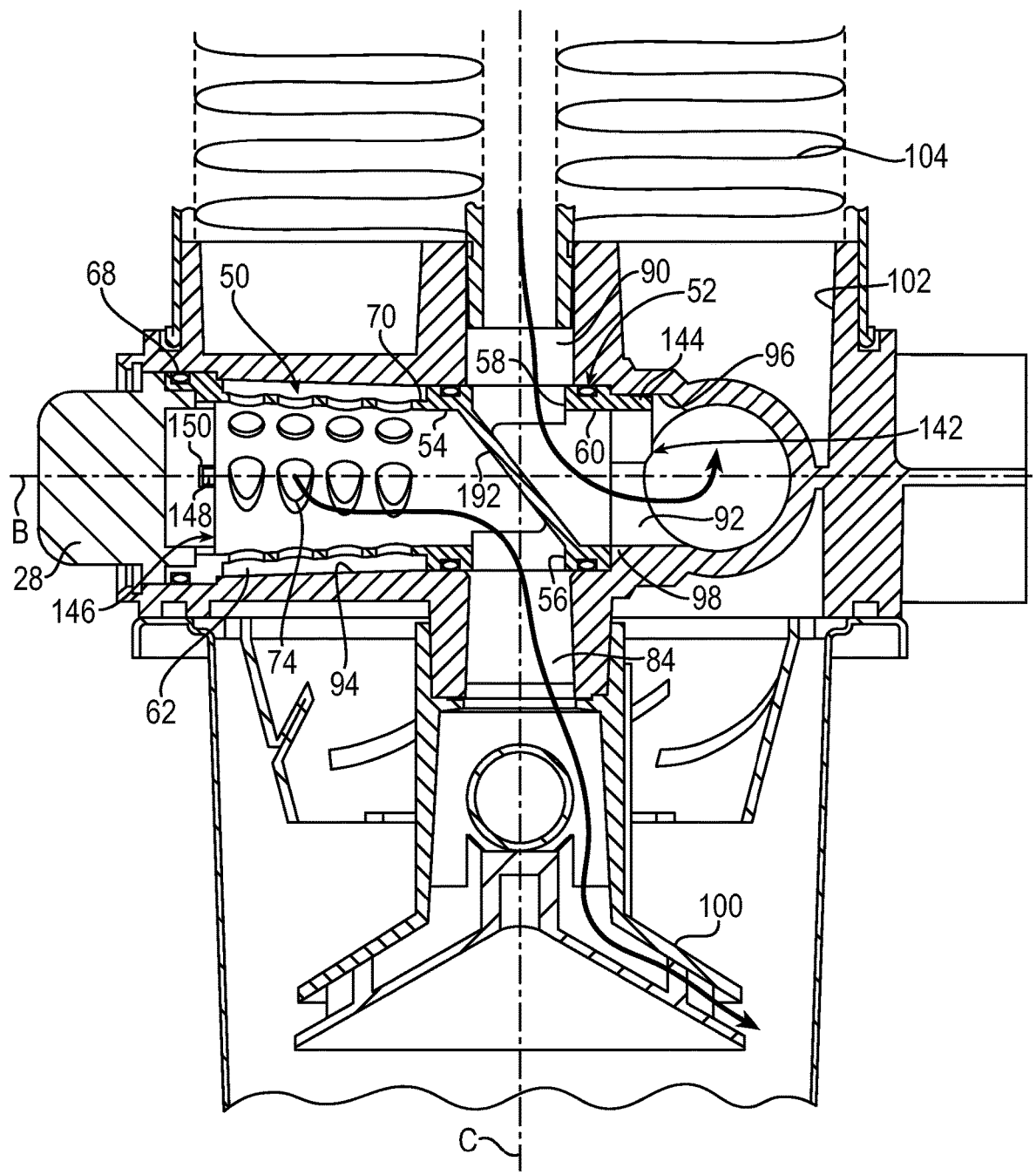
FIG. 9 is a cross-section of one of the filter assemblies for use in the filtration system of FIG. 1 in an open position.
Figure 10:
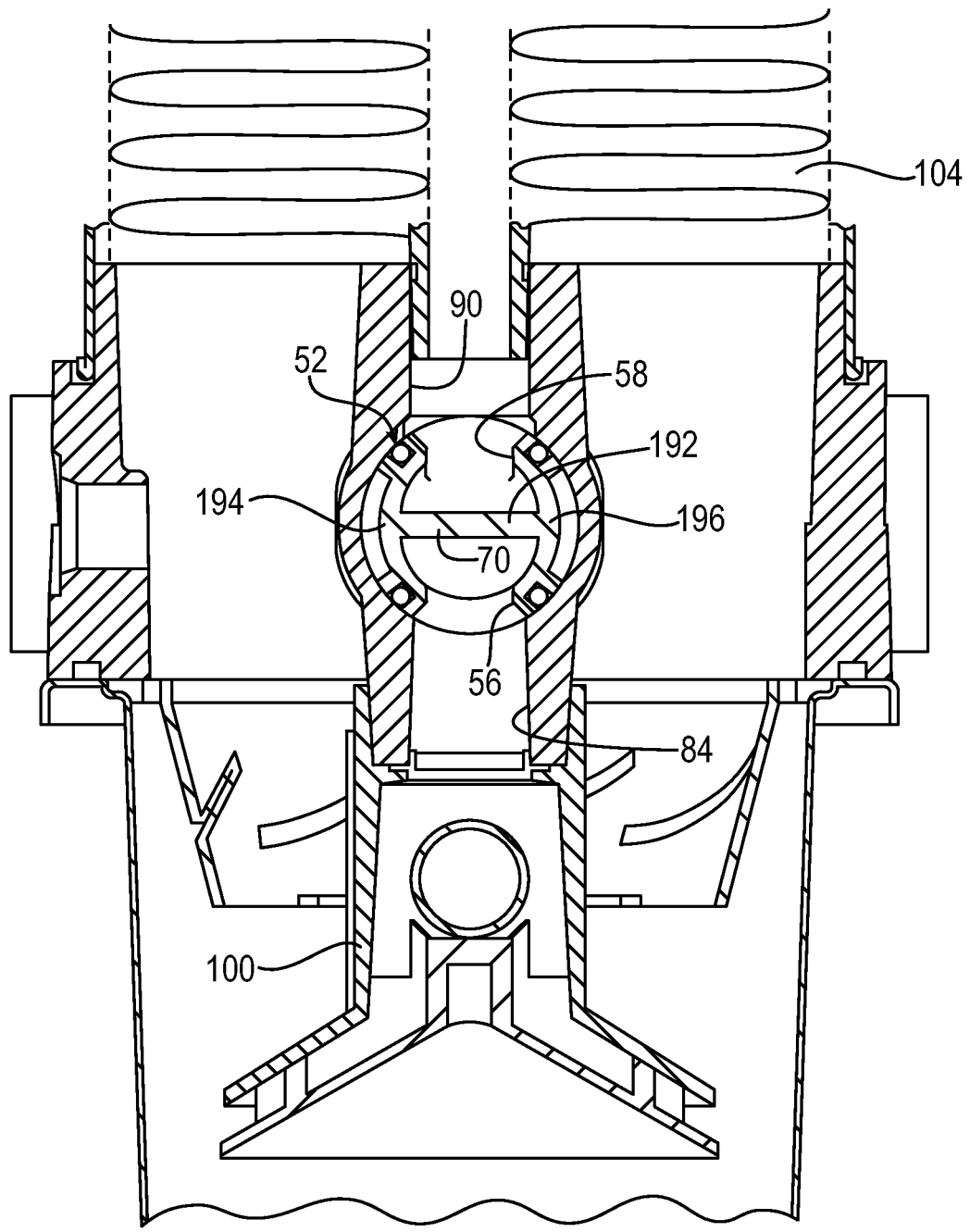
FIG. 10 is a second cross-section from a rotated viewpoint of the filter assembly of FIG. 9 in an open position.
Figure 11:
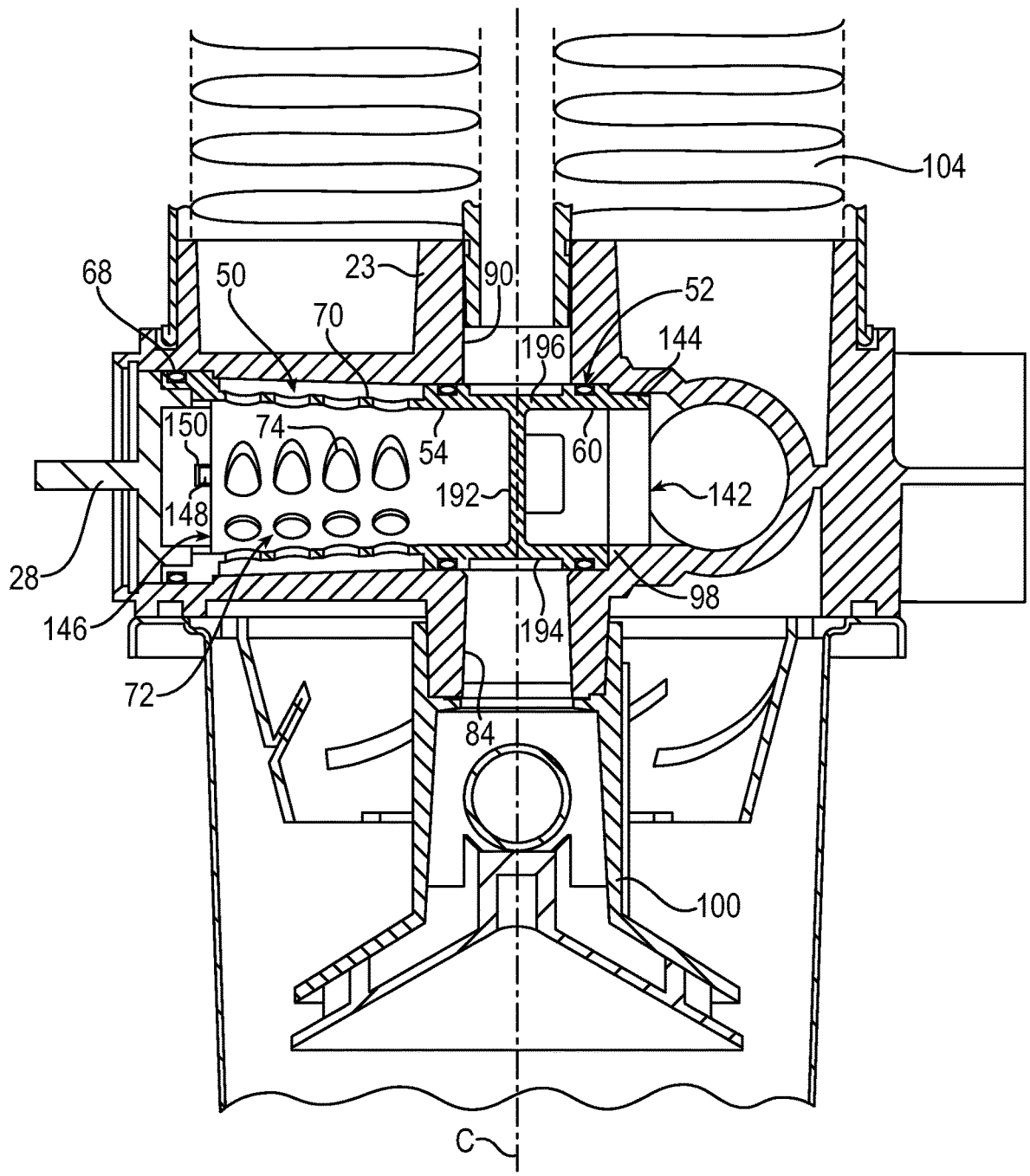
FIG. 11 is a cross-section of one of the filter assemblies for use in the filtration system of FIG. 1 in a closed position.
Figure 12:
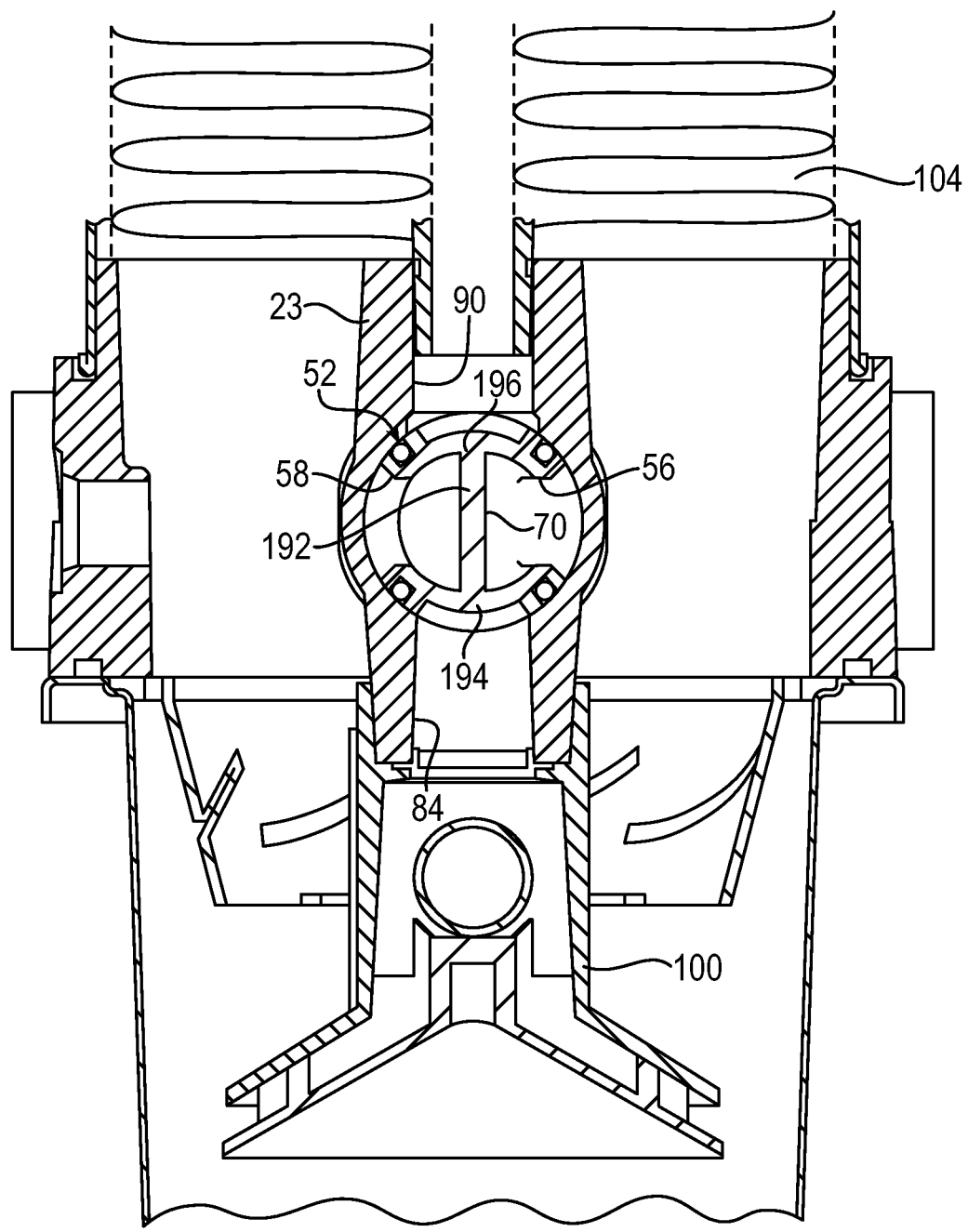
FIG. 12 is a second cross-section from a rotated viewpoint of the filter assembly of FIG. 11 in a closed position.
Figure 13:
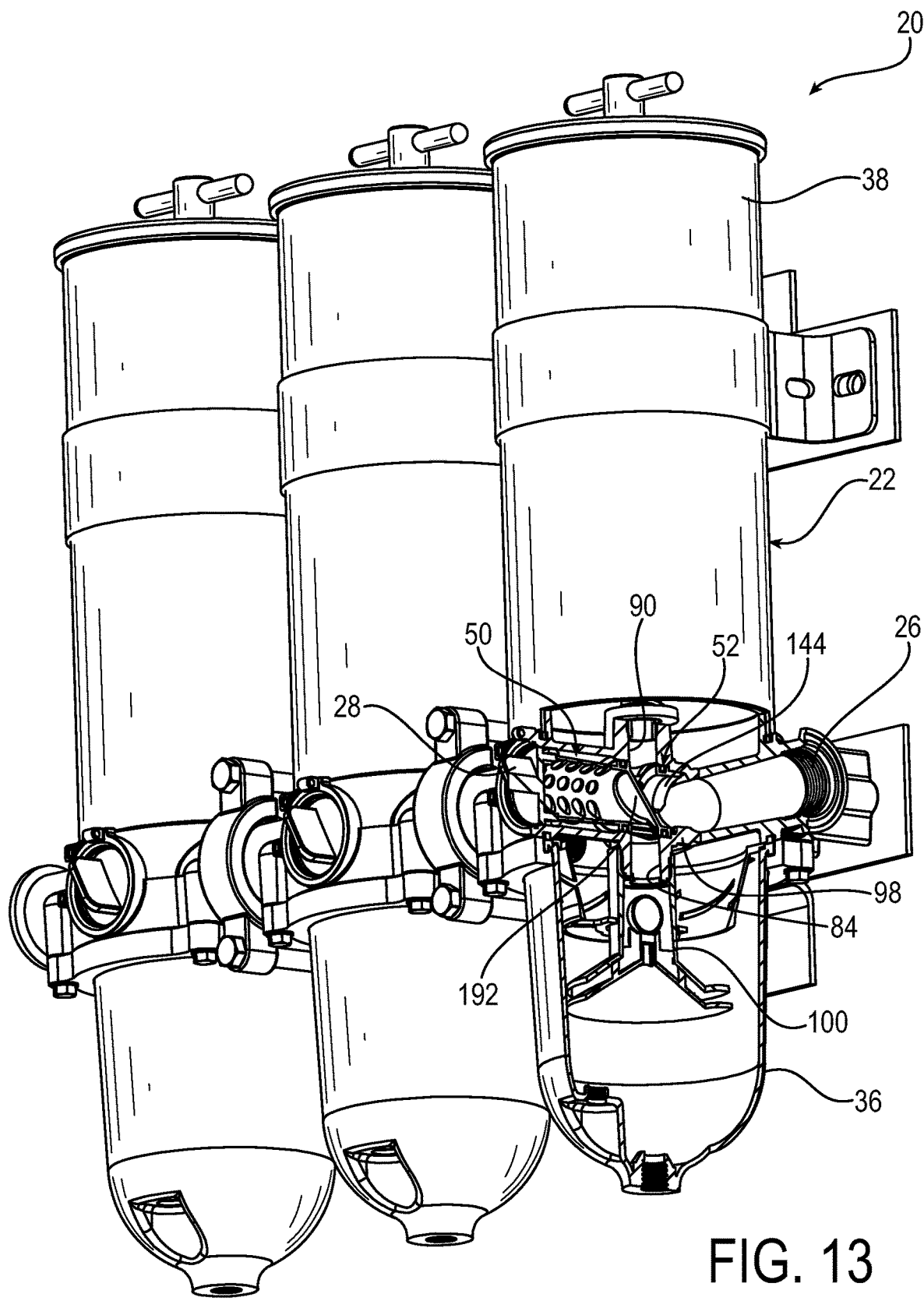
FIG. 13 is a cross-section of a filtration system of FIG. 1 with a portion of one of the filter assemblies cut-out and in a partially open position.
Figure 14:
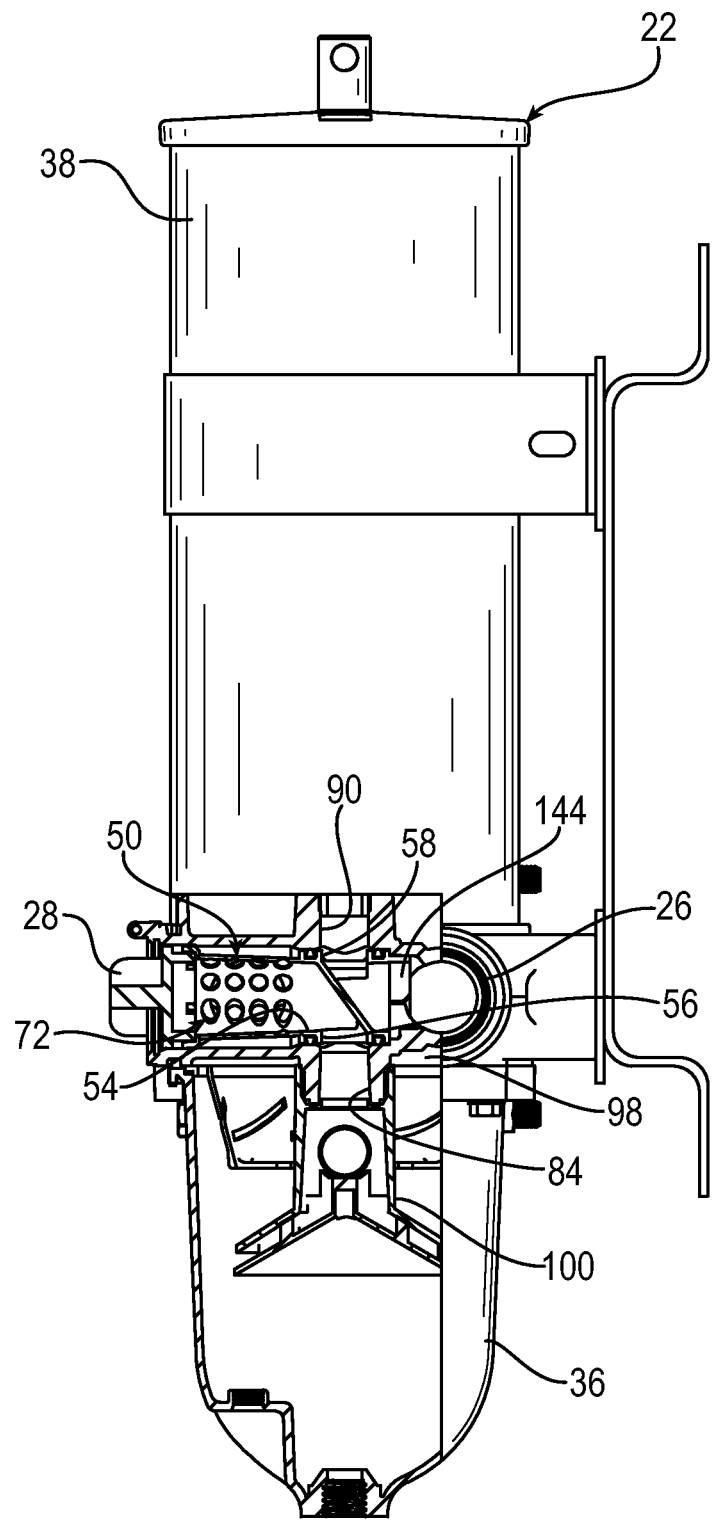
FIG. 14 is a side view of the filter assembly with the partial cut-out of FIG. 13.

Turning to FIG. 4, the valve 50 may include a valve member 70 having a flow through passage 72, the unfiltered inlet 54, the unfiltered outlet 56, the filtered inlet 58, a filtered outlet 60 (shown in FIG. 9), and a drum shaped seal 52 for sealing against an inner wall 94 of the manifold module 23 (shown in FIGS. 9 and 11). FIGS. 8-14 show a configuration of the valve 50 within one of the filter assemblies 22.

Figure 5:
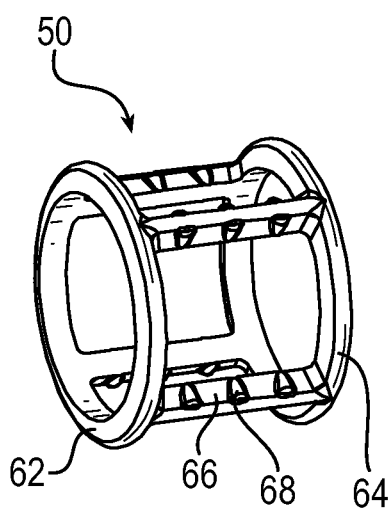
FIG. 5 is a perspective view of an exemplary drum shaped seal for use in the filtration system of FIG. 1.
Figure 6:
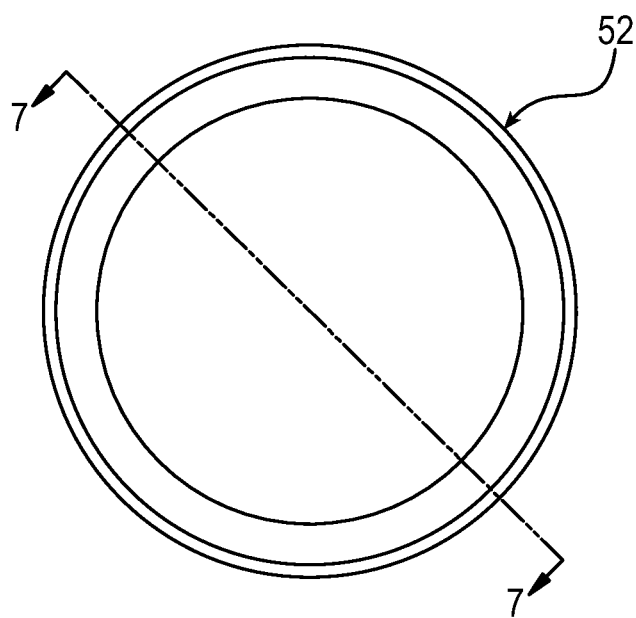
FIG. 6 is a top view of the drum shaped seal of FIG. 5.
Figure 7:
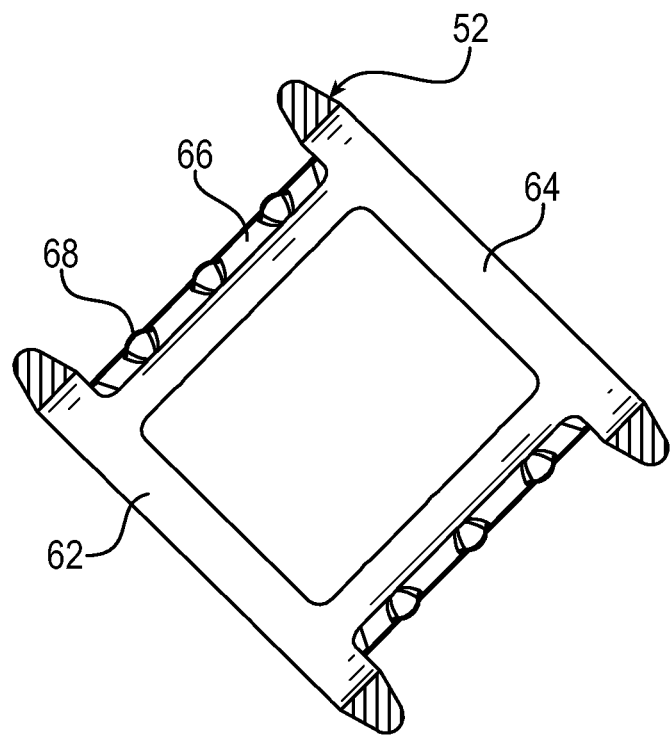
FIG. 7 is a cross-section of the drum shaped seal of FIG. 5.
Figure 8:
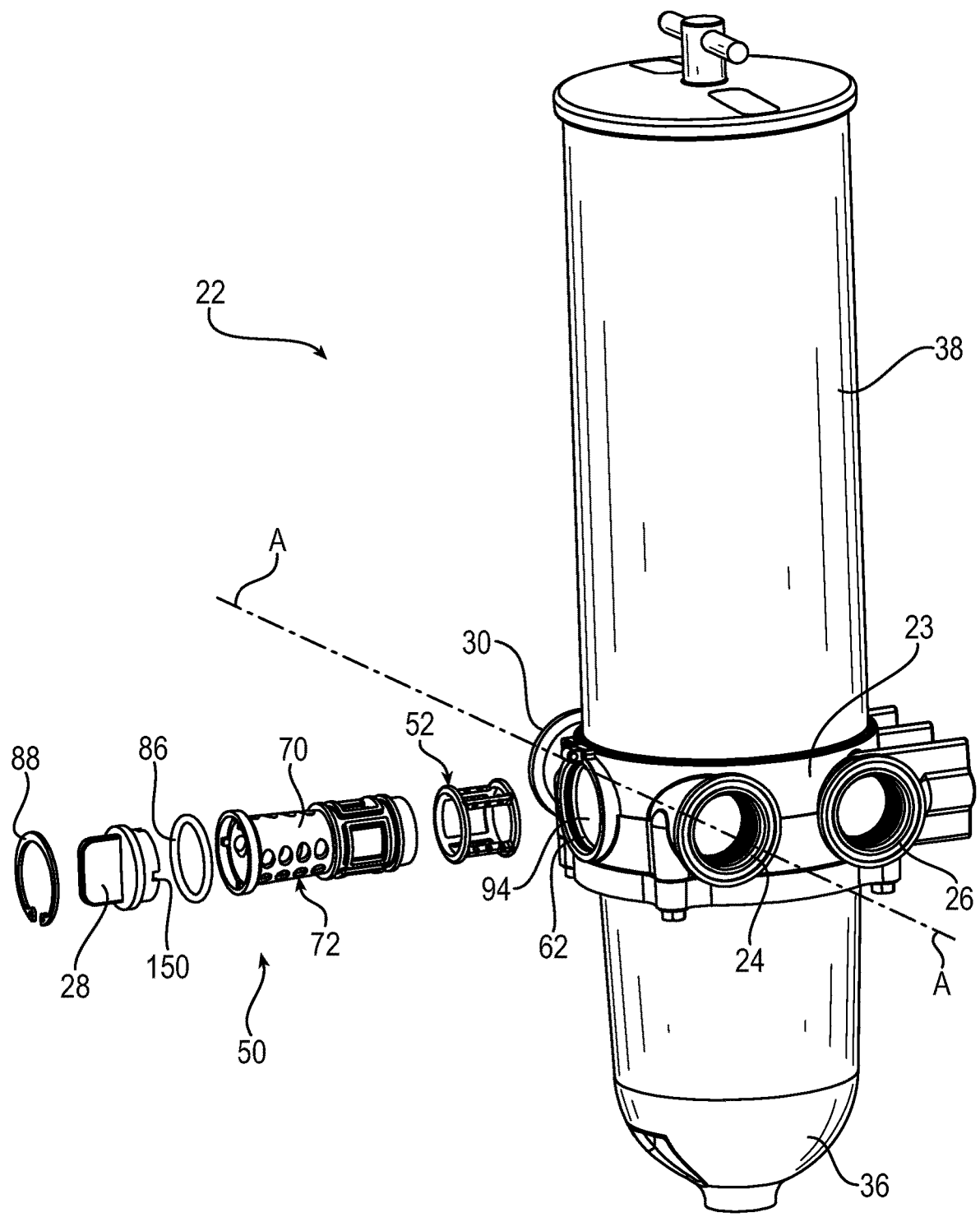
FIG. 8 is an exploded view of one of the filter assemblies for use in the filtration system of FIG. 1.

Referring briefly to FIGS. 5-7, the drum shaped seal 52 may be disposed about the valve member to seal an unfiltered inlet 54, an unfiltered outlet 56, a filtered inlet 58, and the filtered outlet 60 (shown in FIG. 9). The drum shaped seal 52 may have a first circular portion 62 and a second circular portion 64 separated by a plurality of axially extending portions 66. The axially extending portions 66 may be circumferentially spaced apart to correspond to the unfiltered outlet 56 and the filtered inlet 58.

The axially extending portions 66, the first circular portion 62 and/or the second circular portion 64 may have a cross-section that is triangular for ease of molding of the drum shaped seal. At least one of the axially extending portions 66 may include conical protrusions 68 that extend circumferentially from the corresponding axially extending portion 66 to engage the valve member 70 upon assembly of the drum shaped seal 52 with the valve member 70.

Referring again to FIG. 4, the valve member 70 may be configured to receive the drum shaped seal 52. For example, the valve member 70 may include a seal receiving cavity 110, a seal receiving cavity 112, and a plurality of seal receiving cavities 114.

The seal receiving cavity 110 may disposed between a flow through passage 72 and the unfiltered outlet 56. The seal receiving cavity 110 may extend about the longitudinal axis and along a radially outwardly facing portion of the valve member 70. The seal receiving cavity 110 may receive the first circular portion 62 of the drum shaped seal 52 to prevent fluid flow between the valve member 70 and the inner wall 94 of the manifold module 23.

The seal receiving cavity 112 may be disposed between the filtered inlet 58 and the filtered outlet 60. The seal receiving cavity 112 may extend about the longitudinal axis and along a radially outwardly facing portion of the valve member 70. The seal receiving cavity 112 may receive the second circular portion 112 of the drum shaped seal 52 to prevent fluid flow between the valve member 70 and the inner wall 94 of the manifold module 23.

The seal receiving cavities 114 may be disposed adjacent either side of the unfiltered outlet 56 and/or on either side of the filtered inlet 58. The seal receiving cavities 114 may extend longitudinally and along a radially outwardly facing portion of the valve member 70 to prevent fluid leakage from or into the unfiltered outlet 56 and/or the filtered inlet 58. For example, each seal receiving cavity 114 may be circumferentially spaced 90° from the next to form a continuous cavity around the unfiltered outlet 56 and/or the filtered inlet 58 with the seal receiving cavities 110, 112. The seal receiving cavities 114 may receive the axially extending portions 66 of the drum shaped seal 52.

The flow through passage 72 may allow unfiltered fluid flow from the first inlet 24 (shown in FIG. 8) to the second outlet 30 (shown in FIG. 8) regardless of whether the valve 50 is in the open or closed position. The flow through passage 72 may be a foraminous section that includes a plurality of holes 74 to allow the unfiltered fluid flow. The holes 74 may be arranged in an array of longitudinally aligned rows. The aligned rows of holes 74 may be circumferentially offset from one another to allow flow from the first inlet 24 to the second outlet 30 regardless of the position of the valve 50. The rows may be circumferentially offset by 15° about the longitudinal axis to allow continuous flow while rotating the valve 50. Alternatively, the holes may be spaced about the longitudinal axis to prevent fluid flow from the inlet to the outlet when in at least one of the open, closed, and/or partially open positions. Preventing fluid flow from the inlet to the outlet may be desirable for the last filter assembly in a line of filter assemblies.

The unfiltered inlet 54 (shown best in FIGS. 9 and 11) is fluidly connected to the unfiltered outlet 56 (shown best in FIG. 9). The unfiltered inlet may be disposed centrally within the valve member between the flow through passage and the unfiltered outlet. The unfiltered inlet may extend radially outward from the longitudinal axis.

The unfiltered outlet 56 is disposed radially outward from the longitudinal axis. The unfiltered outlet 56 may extend along the longitudinal axis and circumferentially about the longitudinal axis. For example, the unfiltered outlet 56 may extend 90° or less. Extending less than 90° allows the unfiltered outlet 56 to be moved from a fully-aligned position with a maximum flow rate to a fully-unaligned position with a minimum flow rate through the coalescer inlet 84. Reducing or enlarging the unfiltered outlet 56 allows a reduction or increase of unfiltered flow through the unfiltered outlet 56 when in an open or partially open position. In an embodiment, the unfiltered outlet extends less than 45° about the longitudinal axis. In another embodiment, the unfiltered outlet extends more than 90°.

The filtered inlet 58 (shown best in FIG. 9) is fluidly connected to the filtered outlet 60 (shown in FIGS. 9 and 11). The filtered inlet 58 may be disposed radially outward from the longitudinal axis. For example, the filtered inlet 58 may be disposed opposite the unfiltered outlet 56 relative to the longitudinal axis. Preferably, the filtered inlet 58 is diametrically opposite the unfiltered outlet 56.

The filtered inlet 58 may extend along the longitudinal axis and circumferentially about the longitudinal axis. For example, the filtered inlet 58 may extend 90° or less. Extending less than 90° allows the filtered inlet 58 to be moved from a fully-aligned position with a maximum flow rate to a fully-unaligned position with a minimum flow rate through the filter outlet 90. Reducing or enlarging the filtered inlet 58 allows a reduction or increase of filtered flow through the filtered inlet 58 when in an open or partially open position. In an alternative embodiment, the filtered inlet extends less than 45° about the longitudinal axis. In another embodiment, the filtered inlet extends more than 90° about the longitudinal axis.

The filtered outlet 60 may be disposed at an end of the valve member 70 opposite the unfiltered inlet 54 relative to the unfiltered outlet 56. The filtered outlet 60 may be separated from the unfiltered inlet 54 by a flow separation wall 192 (shown best in FIGS. 9-14). Preferably, the filtered outlet 60 is symmetrical with the unfiltered inlet. For example, the filtered outlet 60 may be parallel with the unfiltered inlet 54. The filtered outlet 60 may extend radially outward from the longitudinal axis. The diameter of the filtered outlet 60 may be equal to the diameter of the unfiltered inlet 54. In an embodiment, the filtered outlet is smaller than the unfiltered inlet. In another embodiment, the filtered outlet is larger than the unfiltered inlet.

During use, the unfiltered fluid flow and the filtered fluid flow do not inter-mix within the valve 50. For example, unfiltered fluid flow through the flow through passage 72 to the second outlet 30 is separate from the unfiltered flow through the unfiltered inlet 54 and the filtered flow through the filtered inlet 58. Thus, the filtered fluid flow entering the filtered inlet 58 may remain uncontaminated by the unfiltered fluid entering the unfiltered inlet 54. In other words, the unfiltered fluid flow through the flow through passage 72 does not flow through the unfiltered inlet 54 inlet or the filtered inlet 58. Rather, the unfiltered fluid flow through the flow through passage 72 continues to the next adjacent filter assembly.

When the valve 50 is open, the fluid flow enters through a portion of the flow through passage 72, such as the holes 74, and a first part of the flow enters the unfiltered inlet 54 and flows out the unfiltered outlet 56. The first part of the flow is filtered by a filter 104 (shown in FIGS. 9 and 10) and is prevented from mixing with a second part of the flow between the valve member 70 and the inner wall 94 of the manifold module 23 by the drum shaped seal 52.

Turning now to FIGS. 8-14, one of the filter assemblies 22 is illustrated. The manifold module 23 will be described first without reference to the valve 50. The first inlet 24 may extend along lateral axis A and may be fluidly connected to the second outlet 30 by a valve passage 62 that is fluidly connected to a coalescer inlet 84 and a filter outlet 90. The coalescer inlet 84 and the filter outlet 90 may be fluidly connected to the second inlet 32 and first outlet 26 by a discharge inlet 92.

The first inlet 24 may include a cylindrical passage that extends along the lateral axis A partially through the manifold module 23. The second outlet 30 may include a cylindrical passage that extends partially through the manifold module 23 coincident with the first inlet 24. The second inlet 32 (not shown) and first outlet 26 may similarly extend through the manifold module 23 coincident to one another and parallel to the lateral axis.

The valve passage 62 may extend partially through the manifold module 23 to fluidly connect the first inlet 24 to the second outlet 30 and the coalescer inlet 84 perpendicular to the lateral axis. The valve passage 62 may be cylindrical and configured to receive the valve 50. The valve passage 62 is illustrated as being defined by a cylindrical inner wall 94 of the manifold module 23. The cylindrical inner wall 94 may have a radius that matches an outermost portion of the valve 50 for sealing against the valve 50.

The filter assembly 22 may include a seal 86, such as an o-ring, disposed between the valve control 28 and the valve member 70 to prevent leakage out of the valve passage 62.

The filter assembly 22 may include a retaining ring 88 disposed opposite the o-ring 86 relative to the valve control 28 to prevent axial movement of the valve 50 out of the valve passage 62.

The coalescer inlet 84 and the filter outlet 90 are offset from one another about a longitudinal axis B (see FIG. 9) that is perpendicular to the lateral axis A. Offsetting the coalescer inlet 84 and the filter outlet 90 allows the valve member 70 to seal against the cylindrical inner wall 94 between the coalescer inlet 84 and the filter outlet 90. The coalescer inlet 84 and the filter outlet 90 may be diametrically opposite each other relative to the longitudinal axis.

Both the coalescer inlet 84 and the filter outlet 90 are longitudinally spaced from each end of the valve passage 62 to allow the valve 50 to seal against the inner wall 94 of each longitudinal side of the coalescer inlet 84 and the filter outlet 90. For example, the longitudinal spacing of the coalescer inlet 84 may provide a portion of the inner wall 94 on either longitudinal side of the coalescer inlet 84 to allow the valve 50 to seal against each portion of the inner wall 94 around an opening of the coalescer inlet 84. The longitudinal spacing of the filter outlet 90 provides a portion of the inner wall 94 on either side of the filter outlet 90 to allow the valve 50 to seal around an opening of the filter outlet 90.

The coalescer inlet 84 and the filter outlet 90 are illustrated as concentric with a vertical axis C (see FIG. 9) that is perpendicular to the lateral axis A and the longitudinal axis B. In an embodiment, the coalescer inlet and the filter outlet may be longitudinally offset from one another. In another embodiment, the coalescer inlet may have a diameter different from a diameter of the filter outlet.

The discharge inlet 92 may include an axially extending cylindrical inner wall 96 that extends partially about the longitudinal axis. The discharge inlet 92 may include a radially inwardly extending tab 98 for limiting rotation of the valve 50. The radially inwardly extending tab may have a stop surface at each circumferentially spaced apart end of the extending tab 98. In an embodiment, the radially inwardly extending tab may be a plurality of tabs to restrict rotation of the valve.

When the valve is in an open position unfiltered fluid flows into the valve 50 and to the coalescer 36 where coalesced water may be removed from the unfiltered fluid. The unfiltered fluid may be directed in a spiral path by a turbine 100 to facilitate water removal.

From the coalescer 36, the unfiltered fluid is directed through a filter passage 102 to the filter 104. The unfiltered fluid may flow up to the filter 104 from the coalescer 36. In an embodiment, a coalescer is not utilized and the unfiltered fluid is directed to a filter.

The filter 104 filters the unfiltered fluid and directs filtered fluid to the filter outlet 90. The filtered fluid flows from the filter outlet 90 to the valve member 70 and to the discharge inlet 92. Once the filtered fluid reaches the discharge inlet 92, the filtered fluid may flow out the first outlet 26 for use by a vehicle component, such as an engine.

The valve 50 controls unfiltered fluid flow from the first inlet 24 to the coalescer 36 and controls flow from the filter 104 to the first outlet 26.

The valve member 70 may be configured to allow unfiltered flow from the unfiltered inlet 54 to the unfiltered outlet 56, and allow filtered fluid flow from the filtered inlet 58 to the filtered outlet 60, when the valve member 70 is in an open position. The valve member 70 extends along the longitudinal axis B. The valve member 70 may extend a length greater than the cylindrical inner wall 94. The valve member 70 may be generally cylindrical to allow rotational movement within the valve passage 62. A first end 142 of the valve member 70 is inserted first into the valve passage 62. The valve member 70 may have an axially extending stop tab 144 for engaging the radially inwardly extending tab 98 of the manifold module 23. The stop tab 144 may extend circumferentially about the longitudinal axis to allow 90° of rotational movement of the valve member 70 during use.

For example, the stop tab 144 may extend 180° about the longitudinal axis and the radially inwardly extending tab 98 may extend 90° about the longitudinal axis. Thus, a first end of the stop tab 144 may engage a first end of the radially inwardly extending tab 98 (shown in FIGS. 9, 11, 13, and 14) in the open position, and a second end of the stop tab 144 may engage a second end of the radially inwardly extending tab 98 (shown in FIGS. 9, 11, 13, and 14) in the closed position. Also, the stop tab 144 may prevent full axial insertion of the valve member 70 until the valve member 70 is oriented properly in the open, closed, and/or partially open position.

During insertion a second end 146 of the valve member 70 may follow the first end 142 into the valve passage 62. A radially outermost portion of the second end 146 may extend radially outward past the cylindrical inner wall 94 to prevent further axial movement of the valve member 70 into the valve passage 62. Preventing further axial movement allows proper axial alignment of the valve member 70 in the manifold module 23.

The valve control 28 may be configured to rotate the valve member to allow opening or closing of the valve 50. For example the valve control 28 may be configured to rotate the valve member 90°, from the open position to the closed position. The valve member 70 may have a plurality of tabs 148 for engaging the valve control 28 (shown in FIGS. 8, 9, and 11) at the second end 146. For example, the valve control 28 may be a knob with a plurality of notches 150. The tabs 148 may extend radially inwardly to engage corresponding notches 150 in the valve control 28. Each tab 148 may be spaced 90° from the next tab about the longitudinal axis. In an alternative embodiment, only a single tab is provided. In another embodiment, the valve control includes a tab to engage a notch in the valve member. In yet another embodiment, the valve control is attached to the valve member in any other suitable manner, such as adhesive, injection molding, or press fitting.

Referring to FIGS. 9 and 10, the valve member 70 may include the flow separation wall 192 to fluidly separate the unfiltered fluid flow from the filtered fluid flow. The flow separation wall 192 may extend from a first interior portion of the valve member 70 that is adjacent to the unfiltered inlet 54 and the filtered inlet 58 to a second interior portion of the valve member that is adjacent to the unfiltered outlet 56 and the filtered outlet 60. For example, the flow separation wall 192 may extend at a 45° relative to the vertical axis C. The flow separation wall 192 may also extend parallel with the lateral axis A from a side wall 194 of the valve member 70 to a side wall 196 of the valve member 70.

Each side wall 194, 196 may extend between the unfiltered outlet 56 and the filtered inlet 58. The side walls 194, 196 may be opposite one another relative the longitudinal axis. For example, the side walls 194, 196 may be diametrically opposed to one another. In the closed position (shown in FIGS. 11 and 12) fluid is blocked from flowing through the unfiltered outlet 56, and fluid is blocked from flowing through the filtered outlet 60.

The second part of the flow exits the filter 104, enters the filtered inlet 58 and flows out of the filtered outlet 60. The second part of the flow may have a flow rate substantially identical to the flow rate of the first part of the flow. For example, the first part of the flow may pass through the coalescer 36 and the filter 104 where the second part of the flow begins. The flow rate of the second part may be slightly less than the first part of the flow because coalesced water will be removed and particles will be filtered from the first part of the flow.

A third part of the fluid flow may flow into and out of the flow through passage 72. The third part may continue to the next adjacent filter assembly to be filtered. The third part may have a flow rate different from the first part and the second part. For example, the third part may provide flow for more than two downstream filter assemblies. Preferably, the flow rate of the third part will be at least twice the flow rate of the first and second parts to accommodate the at least two downstream filter assemblies. The third part of the flow is prevented from mixing with the first and second parts between the valve member 70 and the inner wall 94 by the drum shaped seal 52. In an alternative embodiment, the third part of the flow is not provided and all flow into the flow through passage is first part of the flow.

When the valve 50 is in a closed position, the unfiltered fluid flows through the flow through passage 72, and fluid does not flow through the unfiltered inlet 54 or the filtered inlet 58. Fluid pressure driving the first part of the flow through the coalescer 36 and the filter 104 reduces to zero by fluidly disconnecting the coalescer inlet 84 from the filtered first inlet 24. At the same time, the filter outlet 90 may be fluidly disconnected from the filtered first outlet 26 and the filtered second inlet 32 to allow removal of the filter 104 without leakage due to back flow from the filtered second inlet 32.

Figure 15:
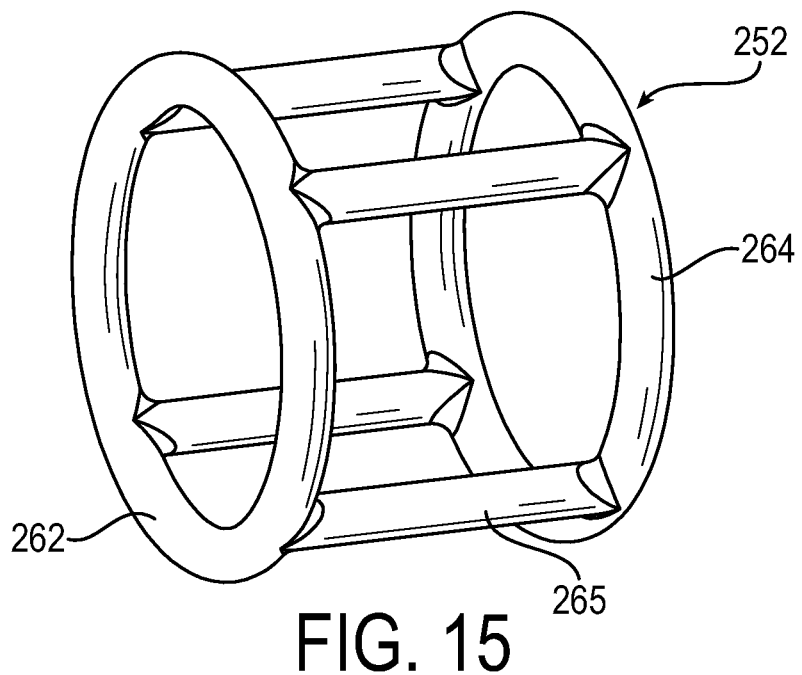
FIG. 15 is a perspective view of another exemplary drum shaped seal.
Figure 16:
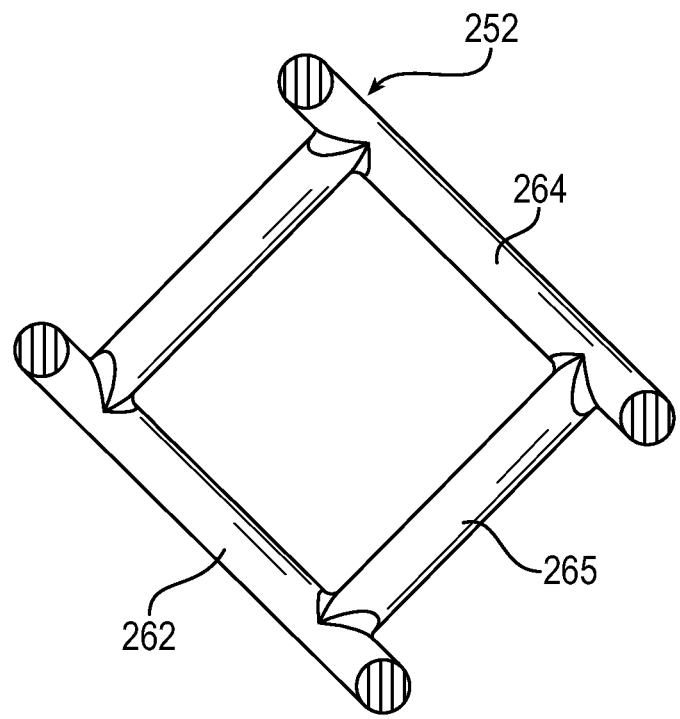
FIG. 16 is a cross-section of the drum shaped seal of FIG. 15.

Turning now to FIGS. 15 and 16, an exemplary embodiment of the drum shaped seal is shown at 332. The drum shaped seal 332 is substantially the same as the above-referenced drum shaped seal 52, and consequently the same reference numerals but indexed by 200 are used to denote structures corresponding to similar structures in the drum shaped seal. In addition, the foregoing description of the drum shaped seal 52 is equally applicable to the drum shaped seal 332 except as noted below. Moreover, it will be appreciated upon reading and understanding the specification that aspects of the drum shaped seals may be substituted for one another or used in conjunction with one another where applicable.

The axially extending portions 265, the first circular portion 262 and/or the second circular portion 264 may have a cross-section that is circular for easier rotation of the corresponding valve 250.

According to one aspect of the invention, a filter assembly comprising a manifold module having a portion of a supply line, a portion of a discharge line, and a valve passage fluidly connecting the portion of the supply line to the portion of the discharge line, and a valve member extending along a longitudinal axis and having a first inlet fluidly connected to the portion of the supply line and a first outlet, and having a second inlet fluidly connected to the portion of the discharge line and the second outlet, wherein the valve member is configured to allow a first fluid flow from the first inlet to the first outlet and from the first outlet to the filter, and allow a second fluid flow from the filter to the second inlet and from the second inlet to the second outlet when the valve member is in an open position, and wherein the first fluid flow and the second fluid flow do not inter-mix.

The filter assembly may further comprise a filter within a filter housing of the filter assembly, the filter being fluidly connected to the valve member.

The filter may include filter media to filter the first fluid flow.

The portion of the supply line may extend parallel to the portion of the discharge line.

The portion of the supply line may be fluidly disconnected from the filter, and the portion of the discharge line may be fluidly disconnected from the filter when the valve member is in a closed position.

The valve member may further include a flow through passage configured to allow fluid flow through the valve member and the portion of the supply line.

The fluid flow through the flow through passage may be separate from the first and second fluid flows.

The fluid flow through the flow through passage may not flow through the first inlet or the second inlet.

Fluid flow may enter through a portion of the flow through passage, a first part of the flow may enter the first inlet and flow out the first outlet, a second part of the flow may enter the second inlet and flow out of the second outlet and a third part of the flow may flow out of the flow through passage.

When the valve is in a closed position, fluid may flow through the flow through passage to flow through the portion of the discharge line, and fluid may not flow through the first inlet or the second inlet to reach the portion of the discharge line.

The valve member may be tubular.

The first inlet may be disposed centrally within the valve member between the flow through passage and the first outlet.

The first inlet may extend radially outward from the longitudinal axis.

The valve member may further include a flow separation wall to fluidly separate the first fluid flow from the second fluid flow.

The flow separation wall may extend from a first interior portion of the valve member that is adjacent to the first inlet and the second inlet to a second interior portion of the valve member that is adjacent to the first outlet and the second outlet.

The first outlet may be disposed radially outward from the longitudinal axis.

The second inlet may be disposed radially outward from the longitudinal axis.

The second inlet may be disposed opposite the first outlet relative to the longitudinal axis.

The second inlet may be diametrically opposite the first outlet.

The second outlet may be disposed at an end of the valve member opposite the first inlet relative to the first outlet.

The second outlet may extend radially outward from the longitudinal axis.

In closed position, fluid may be blocked from flowing through the first outlet, and fluid may be blocked from flowing through the second outlet.

The filter assembly may further include a valve control configured to rotate the valve member.

The filter assembly may further include a drum shaped seal disposed about the valve member to seal the inlets and the outlets.

The drum shaped seal may have a first circular portion and a second circular portion separated by a plurality of axially extending portions.

The axially extending portions may be circumferentially spaced apart to correspond to the first outlet and the second inlet.

A cross-section of axially extending portions, the first circular portion and/or the second circular portion may be triangular.

A cross-section of axially extending portions, the first circular portion and/or the second circular portion may be circular.

The valve member may further include seal receiving cavities surrounding adjacent a perimeter of each of the first outlet and the second inlet.

A filtration system may comprise the filter assembly, and a connecting element for fluidly connecting the portion of the supply line of the filter assembly to a second portion of the supply line.

The filtration system may comprise a plurality of filter assemblies in a stacked relationship.

A method of shutting off flow to a filter and from a filter comprising providing the filter assembly, and rotating the valve member of the filter assembly from the open position to a closed position.

A method of removing a filter comprising rotating the valve member of the filter assembly from the open position to a closed position to shut off flow to the filter, and disconnecting the filter from the manifold module.

According to another aspect, a filtration system comprising a plurality of filter assemblies stacked together and fluidly connected in series with one another by a supply line and a discharge line, each filter assembly including a manifold module having a portion of the supply line for unfiltered fluid and a portion of the discharge line for filtered fluid, wherein the supply line is formed by each portion of the supply line and the discharge line is formed by each portion of the discharge line, and wherein the portion of the supply line of the manifold module of a first filter assembly of the filter assemblies fluidly connects to the portion of the supply line of the manifold module of a second filter assembly of the filter assemblies, and the portion of the discharge line of the manifold first filter assembly fluidly connects to the portion of the discharge line of the manifold of the second filter assembly, thereby allowing unfiltered fluid to enter the portion of the supply line of the first filter assembly to reach the second filter assembly and allowing filtered fluid to flow between each portion of the discharge line.

The supply line may fluidly connect to the portion of the supply line of a third filter assembly of the filter assemblies, and the discharge line may fluidly connect to the portion of the supply line of the third filter assembly, thereby allowing unfiltered fluid to enter the portion of the supply line of the first filter assembly to reach the third filter assembly and allowing filtered fluid to flow between each portion of the discharge line.

Each filter assembly may be connectable to an adjacent filter assembly with an axially facing seal and/or a clamp.

According to another aspect, a valve comprising a tubular valve member extending along a longitudinal axis and having a first inlet fluidly connected to a first outlet, and having a second inlet fluidly connected to a second outlet, wherein the valve member is configured to allow a first fluid flow from the first inlet to the first outlet and allow a second fluid flow from the second inlet to the second outlet when the valve member is in an open position, and wherein the first fluid flow and the second fluid flow do not inter-mix.

The valve member may further include a flow through passage configured to allow fluid flow through the valve member.

The fluid flow through the flow through passage may be separate from the first and second fluid flows.

The fluid flow through the flow through passage may not flow through the first inlet or the second inlet.

Fluid flow may enter through a portion of the flow through passage, a first part of the flow may enter the first inlet and flow out the first outlet, a second part of the flow may enter the second inlet and flow out of the second outlet and a third part of the flow may flow out of the flow through passage.

When the valve is in a closed position, fluid may flow through the flow through passage, and fluid may not flow through the first inlet or the second inlet.

The valve member may be cylindrical.

The first inlet may be disposed centrally within the valve member between the flow through passage and the first outlet.

The first inlet may extend radially outward from the longitudinal axis.

The valve member may further include a flow separation wall to fluidly separate the first fluid flow from the second fluid flow.

The flow separation wall may extend from a first interior portion of the valve member that is adjacent to the first inlet and the second inlet to a second interior portion of the valve member that may be adjacent to the first outlet and the second outlet.

The first outlet may be disposed radially outward from the longitudinal axis.

The second inlet may be disposed radially outward from the longitudinal axis.

The second inlet may be disposed opposite the first outlet relative to the longitudinal axis.

The second inlet may be diametrically opposite the first outlet.

The second outlet may be disposed at an end of the valve member opposite the first inlet relative to the first outlet.

The second outlet may extend radially outward from the longitudinal axis.

In closed position, fluid may be blocked from flowing through the first outlet, and fluid may be blocked from flowing through the second outlet.

The valve may further include a valve control configured to rotate the valve member.

The valve may further include a drum shaped seal disposed about the valve member to seal the inlets and the outlets.

The drum shaped seal may have a first circular portion and a second circular portion separated by a plurality of axially extending portions.

The axially extending portions may be circumferentially spaced apart to correspond to the first outlet and the second inlet.

A cross-section of axially extending portions, the first circular portion and/or the second circular portion may be triangular.

A cross-section of axially extending portions, the first circular portion and/or the second circular portion may be circular.

The valve may further include seal receiving cavities surrounding adjacent a perimeter of each of the first outlet and the second inlet.

A filtration system may include the valve.

The filtration system may include a plurality of filter assemblies, at least one of the filter assemblies may include the valve.

A method of shutting off flow to a filter and from a filter comprising providing the valve, and rotating the valve member of the valve from the open position to a closed position.

A method of removing a filter comprising rotating the valve member of the valve from the open position to a closed position to shut off flow to the filter, and disconnecting the filter from a manifold module fluidly connected to the valve.

According to another aspect, a drum shaped seal comprising a first circular portion, a second circular portion, and a plurality of axially extending portions separating the first circular portion from the second circular portion.

According to another aspect, a valve comprising a valve member extending along a longitudinal axis and having a first inlet fluidly connected to a first outlet, and having a second inlet fluidly connected to a second outlet, and the drum shaped seal disposed about the valve member to seal the inlets and the outlets, wherein the valve member is configured to allow a first fluid flow from the first inlet to the first outlet and allow a second fluid flow from the second inlet to the second outlet when the valve member is in an open position, and wherein the first fluid flow and the second fluid flow do not inter-mix.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A valve comprising:
   a tubular valve member extending along a longitudinal axis and having a first inlet fluidly connected to a first outlet, and having a second inlet fluidly connected to a second outlet,
   wherein the valve member is configured to allow a first fluid flow from the first inlet to the first outlet and allow a second fluid flow from the second inlet to the second outlet when the valve member is in an open position,
   wherein the first fluid flow and the second fluid flow do not inter-mix, and
   wherein the valve member is configured to rotate about the longitudinal axis from the open position to a closed position.

2. The valve of claim 1, wherein the valve member further includes a flow through passage configured to allow a third fluid flow through the valve member.

3. The valve of claim 2, wherein the flow through passage is configured such that the third fluid flow through the flow through passage would be separate from the first and second fluid flows.

4. The valve of claim 2, wherein the flow through passage is configured such that the third fluid flow through the flow through passage would not flow through the first inlet and would not flow through the second inlet.

5. The valve of claim 2, wherein the flow through passage is configured to allow the third fluid flow and the first fluid flow to enter through a portion of the flow through passage;
   wherein the first inlet is configured to receive the first fluid flow from the flow through passage;
   wherein the first outlet is configured to allow the first fluid flow to flow out of the first outlet when the valve member is in the open position;
   wherein the second inlet is configured to receive the second fluid flow when the valve member is in the open position;
   wherein the second outlet is configured to allow the second fluid flow to flow out of the second outlet; and
   wherein the flow through passage is configured to allow the third fluid flow to flow out of another portion of the flow through passage.

6. The valve of claim 2, wherein the flow through passage is configured such that when the valve is in the closed position the third fluid flow would flow through the flow through passage, the first fluid flow would not flow through the first inlet, and the second fluid flow would not flow through the second inlet.

7. The valve of claim 1, wherein the valve member further includes a flow separation wall to fluidly separate the first fluid flow from the second fluid flow.

8. The valve of claim 7, wherein the flow separation wall extends from a first interior portion of the valve member that is adjacent to the first inlet and the second inlet to a second interior portion of the valve member that is adjacent to the first outlet and the second outlet.

9. The valve of claim 1, wherein the second inlet is diametrically opposite the first outlet.

10. The valve of claim 1, further including a drum shaped seal disposed about the valve member to seal the inlets and the outlets.

11. The valve of claim 10, wherein the drum shaped seal has a first circular portion and a second circular portion separated by a plurality of axially extending portions;
   wherein the axially extending portions are circumferentially spaced apart to correspond to the first outlet and the second inlet;
   wherein a cross-section of the axially extending portions, the first circular portion and/or the second circular portion is at least one of triangular and/or circular.

* * * * *